2,706,207
PROCESS FOR THE PRODUCTION OF POLYGLYCOL ETHERS

Hermann Schnell, Karl Hintzmann, and Heinrich Rinke, Leverkusen, Germany, assignors to Farbenfabriken Bayer Aktiengesellschaft, Leverkusen, Germany, a corporation of Germany No Drawing. Application March 28, 1951, Serial No. 218,092

Claims priority, application Germany April 5, 1950

4 Claims. (Cl. 260—615)

The present invention relates to the production of polyglycol ethers from polyvalent alcohols.

It is known in the art to produce polyglycol ethers from polyvalent alcohols carrying at least three alcohol groups and from alkylene oxide by reacting about 10 mols of alkylene oxide upon each alcohol group. The resulting polyglycol ethers are liquid which makes them suitable for applications where fluidity is required, for instance, as lubricant, glycerin substituent or as solvent.

In accordance with the present invention we have found that by reacting a polyvalent alcohol carrying at least three alcohol groups with more than 20 mols of alkylene oxide calculated on each alcohol group, novel, solid, wax-like polyglycol ethers are obtained which, due to their solid consistency, are of special technical importance. The polyglycol ethers obtained according to the present invention are suitable for applications for which the above-mentioned polyglycol ethers produced by conventional methods, because of their liquid consistency, could not be employed at all or only with difficulty.

As examples of alcohols that may be used as starting materials for the invention, the following are named: trimethylol propane, trimethylol ethane, hexanetriol, pentaerythrite, nitrotrimethylol methane or mixtures of said compounds. Suitable alkylene oxides according to the invention are, for instance, ethylene oxide, propylene oxide, epichlorohydrin.

For instance, the reaction of more than 60 mols of ethylene oxide upon 1 mol of trimethylol propane—preferably at a temperature between 120 and 180° C.—gives rise to solid products whose melting point is at 45° C. when 90 mols are reacted, at 50–52° C. when 130 mols are reacted, and at 63–65° C. when 600 mols of ethylene oxide are reacted. Products showing a higher melting point simultaneously exhibit an increased hardness. Especially hard waxes are obtained according to the present invention when employing as starting material pentaerythrite or mixtures of trimethylol propane and pentaerythrite. The reaction is advantageously carried out in the presence of sodium alcoholates, especially of those obtainable from the polyvalent alcohols applied. In consideration of the large increase in volume occurring in the reaction of the polyvalent alcohols with more than 20 mols of alkylene oxide per each alcohol group, it may furthermore be of advantage to accomplish the reaction in steps or to start not from the polyvalent alcohols directly but from low molecular reaction products of alkylene oxide and the polyvalent alcohols.

The polyglycol ethers obtained according to the present invention give clear solutions in hot and cold water and do not show the turbidity point to be observed with polyglycol ethers produced according to prior art methods. Furthermore, they dissolve in methanol, acetone, benzene, chloroform and other organic solvents. Due to their solid wax-like consistency they may be particularly advantageously utilized in the textile industry, for instance, for smoothing warps, the more so since, due to their solubility in hot and cold water, they can be readily washed out afterwards.

The present invention is further illustrated by the following examples without being restricted thereto, the parts being by weight.

Example 1

50 parts of trimethylol propane (prepared from butyraldehyde and formaldehyde) are reacted with 0.1 part of sodium and heated after driving out the air by means of an indifferent gas until the sodium has been dissolved. Thereupon 1550 parts of ethylene oxide are introduced at 180–190° C. while vigorously stirring at such a rate as the reaction takes place. A viscous oil solidifying on cooling to a soft wax is thus obtained. The viscous oil is easily soluble in hot and cold water, melts at about 45° C. and contains 32 mols of ethylene oxide per each alcohol group of the trimethylol propane. According to analysis the wax contains 1.2% of free hydroxyl groups.

Example 2

134 parts of trimethylol propane and 1400 parts of ethylene oxide are first reacted, as described in Example 1, with the addtion of 0.1 part of sodium. The paste obtained after cooling is soluble in hot and cold water, contains 10.5 mols of ethylene oxide per each alcohol group of the trimethylol propane and 3.35% of free hydroxyl groups.

After adding 0.2 part of sodium 100 parts of the above preliminary product are reacted with 300 parts of ethylene oxide as described in Example 1. The resulting viscous oil solidifies on cooling to a paraffin-like wax melting at 50–52° C. and dissolving in hot and cold water. The wax contains 45 mols of ethylene oxide per each alcohol group of the trimethylol propane and 0.88% of free hydroxyl groups.

Example 3

50 parts of the wax obtained according to Example 2 and melting at 50–52° C. are reacted after the addition of 0.4 part of sodium as described in Example 1 with a further 170 parts of ethylene oxide. The resulting viscous oil solidifies on cooling to a hard paraffin-like wax melting at 63–65° C. and dissolving in hot and cold water. The aqueous solution shows a viscous consistency. The wax contains 200 mols of ethylene oxide per each alcohol group of the trimethylol propane and 0.5% of free hydroxyl groups.

Example 4

50 parts of 1.3.5-hexanetriol are reacted at 170–180° C. with 0.2 part of sodium and 1890 parts of ethylene oxide, as described in Example 1, while vigorously stirring. The resulting viscous oil solidifies on cooling to a wax of medium hardness melting at 50–55° C. and easily dissolving in hot and cold water. The wax contains 38.4 mols of ethylene oxide per each alcohol group of hexanetriol and 1.6% of free hydroxyl groups.

Example 5

25 parts of trimethylol propane, 25 parts of pentaerythrite and 0.2 part of sodium are heated while introducing ethylene oxide until a homogeneous melt has been formed. A vivacious reaction of ethylene oxide starts at about 140° C. At 180–190° C. 1510 parts of ethylene oxide are introduced with vigorous stirring at a rate as the ethylene oxide reacts. One obtains a viscous oil solidifying on cooling to a hard paraffin-like wax. The wax melts at 42–47° C. and is readily soluble in hot and cold water; it contains 26.3 mols of ethylene oxide per each alcohol group of the alcohol mixture and 1.7% of free hydroxyl groups.

We claim:

1. Process for the production of polyglycol ethers which comprises reacting a polyvalent alcohol carrying three alkylol groups on one and the same carbon atom with more than 20 mols of ethylene oxide calculated on each alcohol group, in the presence of a sodium alcoholate obtainable from the polyvalent alcohol applied.

2. Process as defined in claim 1, wherein the polyvalent alcohol is trimethylol propane.

3. Process as defined in claim 1, wherein the polyvalent alcohol is a mixture of trimethylol propane and pentaerythrite.

4. A process as defined in claim 1, wherein the polyvalent alcohol is a mixture of trimethylol propane and a polyvalent alcohol containing at least three alcohol groups.

References Cited in the file of this patent

UNITED STATES PATENTS

| | | |
|---|---|---|
| 2,527,970 | Sokol | Oct. 31, 1950 |
| 2,552,528 | De Groote | May 15, 1951 |
| 2,552,529 | De Groote | May 15, 1951 |
| 2,552,532 | De Groote | May 15, 1951 |
| 2,554,667 | De Groote | May 29, 1951 |